(12) United States Patent
Kim et al.

(10) Patent No.: US 12,109,650 B2
(45) Date of Patent: Oct. 8, 2024

(54) PLANING-POLISHING APPARATUS AND METHOD USING FEMTOSECOND PULSED LASER

(71) Applicant: 21TH CENTURY CO., LTD, Hwaseong-si (KR)

(72) Inventors: Sung Hwan Kim, Suwon-si (KR); Hyoung Shik Kang, Hwaseong-si (KR); Dong Bin You, Hwaseong-si (KR)

(73) Assignee: 21TH CENTURY CO., LTD, Hwaseong-si (KR)

( * ) Notice: Subject to any disclaimer, the term of this patent is extended or adjusted under 35 U.S.C. 154(b) by 119 days.

(21) Appl. No.: 17/403,989

(22) Filed: Aug. 17, 2021

(65) Prior Publication Data

US 2022/0241899 A1 Aug. 4, 2022

(30) Foreign Application Priority Data

Feb. 3, 2021 (KR) .................. 10-2021-0015534

(51) Int. Cl.
*B23K 26/36* (2014.01)
*B23K 26/03* (2006.01)

(52) U.S. Cl.
CPC .............. *B23K 26/36* (2013.01); *B23K 26/03* (2013.01)

(58) Field of Classification Search
CPC ................ B23K 26/36; B23K 26/0624; B23K 26/3576; B23K 26/03; B23K 26/032
See application file for complete search history.

(56) References Cited

U.S. PATENT DOCUMENTS

| | | | |
|---|---|---|---|
| 5,736,709 A * | 4/1998 | Neiheisel | B23K 26/123 219/121.75 |
| 2003/0068836 A1* | 4/2003 | Hongo | H01L 21/02422 438/30 |
| 2006/0081573 A1* | 4/2006 | Wissenbach | C21D 1/09 219/121.66 |
| 2019/0001442 A1* | 1/2019 | Unrath | B23K 26/703 |

FOREIGN PATENT DOCUMENTS

| | | | | |
|---|---|---|---|---|
| CN | 101767252 B | * | 10/2012 | |
| CN | 106001927 B | * | 3/2018 | .......... B23K 26/082 |
| JP | 2014-048044 A | | 3/2014 | |
| KR | 10-2006-0017580 A | | 2/2006 | |
| KR | 10-2012-0051587 A | | 5/2012 | |
| KR | 10-1358332 B1 | | 2/2014 | |
| KR | 10-2015-0097475 A | | 8/2015 | |
| KR | 10-1594688 B1 | | 2/2016 | |
| KR | 10-2094556 B1 | | 3/2020 | |

\* cited by examiner

*Primary Examiner* — Thien S Tran
(74) *Attorney, Agent, or Firm* — Goldilocks Zone IP Law

(57) ABSTRACT

Proposed is a planing-polishing apparatus 1 using a femtosecond pulsed laser and performing polishing of a planar workpiece to reduce surface roughness of the workpiece after performing planing of the workpiece using a femtosecond pulsed laser beam.

18 Claims, 6 Drawing Sheets

PLANING-POLISHING APPARATUS AND METHOD USING FEMTOSECOND PULSED LASER

CROSS-REFERENCE TO RELATED APPLICATION

This application claims priority to and the benefit of Korean Patent Application No. 10-2021-0015534 filed on Feb. 3, 2021 in the Korean Intellectual Property Office, the entire content of which is incorporated herein by reference.

TECHNICAL FIELD

The present disclosure relates to generally a planing-polishing apparatus and method using a femtosecond pulsed laser and, more particularly, to an apparatus and method for performing a planing process of planarizing a large-area planar workpiece, such as a precision mold used for the manufacture of stacked electronic ceramics, and then a polishing process of reducing the surface roughness of the large-area planar workpiece.

BACKGROUND ART

Grinding machining in a broad sense refers to a machining process of planarizing the surface shape of a workpiece and reducing the surface roughness of the workpiece by a variety of methods.

In such machining, grinding for planarizing the surface of a workpiece is realized by the friction of grindstone particles. As a method for reducing the surface roughness, a polishing operation using abrasives provided on a buff made of cloth, leather, felt, or the like is generally performed.

In addition, the polishing operation is performed by a mechanical, electric, or chemical mechanism.

In the case of a mechanical polishing method, the shape of the workpiece that may be machined is limited, a long operation time is taken, the surface roughness is non-uniform due to the loading phenomenon in which the grindstone is clogged with chips, working fluid used degrades the working environment, and the discard of the working fluid leads to environmental pollution. In addition, it is highly probable that work cost may be significantly increased by increased legal regulations due to future environmental issues.

In addition to the mechanical polishing method, an electric or chemical method may be used. However, it is impossible to polish a selected area, there are limitations in a precision operation for obtaining an intended degree of surface roughness, and chemicals used degrade the working environment and still cause environmental pollution. Accordingly, a laser polishing system using a laser beam has recently come to prominence, since the laser polishing system may perform a precision process, reduce the operation time, and be environment-friendly.

As examples of the laser polishing method for reducing surface roughness, "SURFACE TREATMENT METHOD FOR METAL SUBSTRATE FOR ELECTRONICS BY LASER POLISHING" was disclosed in Patent Document 1 (Korean Patent No. 10-1594688, published on Feb. 17, 2016), "METAL SURFACE POLISHING METHOD USING LASER" was disclosed in Patent Document 2 (Korean Patent No. 10-1358332, published on Feb. 6, 2014), and "LASER POLISHING SYSTEM" was disclosed in Patent Document 3 (Korean Patent No. 10-2094556, published on Mar. 30, 2020).

The laser polishing method disclosed in Patent Document 1 is a method of reducing the surface roughness of a substrate used as electronic components using a laser beam. The method includes: a step of measuring the surface roughness Rz of a metal substrate fabricated by rolling; and a step of planarizing the surface of the metal substrate by irradiating the surface of the metal substrate with a laser beam in a perpendicular direction at a speed of from 10 mm/sec to 500 mm/sec. The laser beam has a wavelength of 100 nm or longer. The wavelength is shorter than the measured surface roughness of the metal substrate.

The metal surface polishing method using a laser disclosed in Patent Document 2 includes: a step of forming an anti-oxidation coating film on the surface of a metal material; a step of curing the coating film after the coating film is formed; a step of irradiating the coated metal surface with a laser beam so that the metal surface melts; and removing the coating film from the metal surface after the metal surface has melted. This polishing method has an advantage in that a chamber into which an inert gas used for anti-oxidation purpose is injected may be omitted.

In addition, the laser polishing system disclosed in Patent Document 3 relates to a laser polishing system including a heater preheating a glass substrate to a temperature suitable for the production and manufacture of glass. The laser polishing system controls the temperature of the preheated glass substrate to be constant. The heater enables edges of the glass substrate to be abraded.

Although related-art solutions, such as Patent Documents 1 to 3, use a laser for polishing, all of the related-art solutions reduce the surface roughness of a workpiece by a mechanism that reduces height differences between top portions and bottom portions of surface irregularities of the workpiece by melting the surface irregularities with heat generated by irradiating the surface of the workpiece with a laser beam.

In such laser polishing of the related art, the surface is melted by heat. Thus, during the recrystallization of the molten metal, microstructures in the surface and the hardness of the surface are changed, and residual stress is generated in the surface. Accordingly, there is a technical limitation in that such laser polishing may not be applied to a pressure mold to which high load is repetitively applied.

In particular, in a situation in which a polishing operation is performed on the surface as a finishing process after mechanical properties, such as hardness, strength, toughness, and ductility, suitable for use have been imparted, a change in the mechanical properties of the surface or the generation of residual stress in the surface is necessarily a fatal flaw.

According to the laser polishing operation of the related art, a reduction in a Ra or Ry value, i.e., a measurement value of the surface roughness, is expectable. However, when the surface of the workpiece has macroscopic unevenness, for example, when the unevenness having contour-level top and bottom portions (i.e. top and bottom portions that may be expressed with contour lines) is formed due to a mechanical error during the surface grinding process, only the surface roughness may be reduced to some extent, but there is a limitation in that an improvement in the flatness at a microscale level is not expectable.

Even in the case that the surface of the workpiece has the contour-level unevenness, only the macroscopic top portions may be irradiated with a high-power laser beam. However, focus control of accurately concentrating the focus of the laser beam only to the top portions is actually difficult, and the metal surface is also melted with the high-power laser beam, thereby leading to thermal deformation. Thus, drawbacks that may cause fatal problems to the performance of the workpiece, such as a change in mechanical properties, cracking due to the generation of surface residual stress, and a change in the size, may still not be overcome.

In particular, in a case in which the above-described problems are related to a large-area planar workpiece to which tens or hundreds of tons of load is repetitively applied hundreds of thousands to millions of times, such as a vacuum plate mold used for the manufacture of stacked electronic ceramic components, the surface must be prevented from a change in mechanical properties or the generation of residual stress in the process of the laser polishing while being required to have high-level flatness and surface roughness. Therefore, such problems may not be overcome by only reducing the surface roughness by the laser polishing method of the related art.

Documents of Related Art (Patent Document 1) Korean Patent No. 10-1594688 (published on Feb. 17, 2016)
(Patent Document 2) Korean Patent No. 10-1358332 (published on Feb. 6, 2014)
(Patent Document 3) Korean Patent No. 10-2094556 (published on Mar. 30, 2020)

DISCLOSURE

Technical Problem

Accordingly, the present disclosure has been made keeping in mind the above problems occurring in the related art, and the present disclosure is intended to provide an apparatus and method for performing a planing operation of planarizing the surface of a planar workpiece having a relatively large area using a femtosecond laser, such as a picosecond or femtosecond pulsed laser, and a polishing operation of reducing the surface roughness of the workpiece.

Also provided are an apparatus and method able to reduce the surface roughness without thermal deformation in the surface of the workpiece by irradiating the metal surface with a femtosecond laser beam, instead of reducing the surface roughness by melting the metal surface as in the laser polishing of the related art.

Also provided are an apparatus and method able to not only reduce the surface roughness by machining microscopic irregularities on the surface but also rapidly improve the flatness of the surface by selectively machining macroscopic contour-level unevenness (i.e., macroscopic unevenness that may be expressed with contour lines) by simply controlling the power of a laser beam radiated to the metal surface.

The objectives of the present disclosure are not limited to the aforementioned description, and other objectives and advantages of the present disclosure not explicitly described will be clearly understood from the description provided hereinafter.

Technical Solution

In order to achieve at least one of the above objectives, the present disclosure provides a planing-polishing apparatus (1) using a femtosecond pulsed laser and performing polishing of a planar workpiece to reduce surface roughness of the workpiece after performing planing of the workpiece using a femtosecond pulsed laser beam. The planing-polishing apparatus may include: a position fixing unit (100) including a stage (110) on which a workpiece (P) is seated, a fixing jig (120) for fixing the workpiece (P) on the stage (110), and a transport means (130) for moving the stage (110) along X and Y axes, such that a surface of the workpiece (P) is machined; a surface shape measurement unit (200) digitalizing the surface shape of the workpiece (P) into surface shape data by measuring heights at a plurality of measurement points on the surface of the workpiece (P) and transmitting the surface shape data so that surface flatness of the workpiece (P) is measured; a laser machining unit (300) performing a planing process of planarizing a machining area by selectively irradiating the machining area with a femtosecond pulsed laser beam in accordance with the surface shape data (ZD) obtained from the surface shape measurement unit (200) and, after the planing process, a polishing process of reducing irregularities formed on the surface of the workpiece by irradiating the irregularities with a femtosecond pulsed laser beam having a different power level; and a controller (400) receiving the surface shape data (ZD) obtained from the surface shape measurement unit (200), converting the surface shape data (ZD) into plane data (SD) for the planing process, and controlling the operation of the laser machining unit (300) to perform the planing process by applying machining parameters input for the machining area determined in accordance with the plane data (SD).

The surface shape measurement unit (200) may be a laser displacement sensor configured to measure heights of the measurement points by irradiating the measurement points on the surface of the workpiece (P) with the laser beam and reading the state of the reflected laser beam.

The surface shape data (ZD) measured by the surface shape measurement unit (200) may be data regarding displacements along a Z-axis at the plurality of measurement points. The controller (400) may convert the surface shape data (ZD) into plane data (SD), by which areas protruding to same heights from virtual cross-sectional planes drawn by connecting points having same heights from among the plurality of measurement points are determined to be planing areas, with the virtual cross-sectional planes being maintained to be arranged at predetermined distances in a height direction, transmit machining parameters input for the planing process in accordance with the plane data (SD), and control the operation of the laser machining unit (300).

The laser beam radiated by the laser machining unit (300) in the planing process may be a femtosecond pulsed laser beam having a wavelength of 580 nm or shorter and a pulse length of from 270 fs to 700 fs.

The planing process may be sequentially performed from the planing area on an uppermost layer of the plane data (SD) to the planing area on a lowermost layer of the plane data (SD) by sequentially moving the laser machining unit (300) downward or sequentially moving the stage (110) upward along the Z-axis.

The planing-polishing apparatus may further include an optical camera (CA) disposed at a side of the laser machining unit (300), wherein the optical camera (CA) allows the state of alignment of the workpiece (P) seated on the position fixing unit (100) and a machining state obtained by the laser beam radiated by the laser machining unit (300) to be visually observed in real time. The planing-polishing apparatus may further include a process gas supply unit (G) above the workpiece (P), the process gas supply unit (G)

being configured to control and supply a process gas that is used during laser machining performed by the laser machining unit (300).

The planing-polishing apparatus may further include a dust removing unit (D) removing dust that is formed during laser machining performed by the laser machining unit (300). The dust removing unit (D) may include a negative pressure generator (D1) provided above the stage (110) to generate a negative pressure around the workpiece (P) and a filter (D2) filtering the dust drawn due to the negative pressure.

The stage (110) may further include an elastic anti-vibration pad (V) damping external vibration.

The laser beam used in laser polishing may be a femtosecond pulsed laser beam having a wavelength of 580 nm or shorter and a pulse length of from 270 fs to 700 fs.

According to another embodiment of the present disclosure, there is provided a planing-polishing method using a femtosecond pulsed laser and performing laser polishing of a planar workpiece to reduce surface roughness of the workpiece after performing laser planing to planarize a surface of the planar workpiece using a femtosecond pulsed laser beam. The planing-polishing method may include: a machining preparation step (S1) of locating and fixing the workpiece at a machining origin on a stage in order to machine a surface of the workpiece; a surface shape measurement step (S2) of digitalizing a surface shape of the workpiece into surface shape data by measuring heights at a plurality of measurement points on the surface of the workpiece using a laser displacement sensor; a step (S3) of converting the surface shape data obtained by the surface shape measurement step into multiple-plane data in which virtual cross-sectional planes drawn by connecting points having same heights from among the plurality of measurement points are arranged at predetermined distances, determining areas protruding to same heights from the cross-sectional planes as planing areas, and determining and inputting machining parameters for a planing process; a laser planing step (S4) of planarizing the surface of the workpiece by irradiating, by a laser machining unit, the planing area determined from the surface shape data with a laser beam in a predetermined pattern to which the machining parameters are applied; and a laser polishing step (S5) of reducing irregularities formed on the surface of the workpiece by radiating a femtosecond pulsed laser beam having a lower power level than the laser beam used in the laser planing step (S4), thereby reducing surface roughness of the workpiece.

The machining preparation step, the surface shape measurement step, the laser planing step, and the laser polishing step may be performed while the state of radiation of the laser beam to the workpiece (P) is being visually observed in real time.

The laser planing step may be sequentially performed from the planing area on an uppermost layer of the plane data (SD) to the planing area on a lowermost layer of the plane data (SD) while the laser machining unit is being sequentially moved downward or the stage is being sequentially moved upward along a Z-axis. The laser beam radiated in the laser planing step may be a femtosecond pulsed laser beam having a wavelength of 580 nm or shorter and a pulse length of from 270 fs to 700 fs.

The laser planing step and the laser polishing step may be performed while dust formed during laser machining is being removed by a negative pressure. The workpiece may be a precision mold used in manufacture of stacked electronic ceramics.

The laser planing step and the laser polishing step may be performed while a process gas is being supplied, the process gas preventing a change in mechanical properties of the surface of the workpiece and a surface residual stress in the workpiece from occurring from laser machining. The laser beam used in the laser polishing step may be a femtosecond pulsed laser beam having a wavelength of 580 nm or shorter and a pulse length of from 270 fs to 700 fs.

Advantageous Effects

According to the present disclosure, the planing-polishing apparatus may perform both the planing operation of planarizing the surface of a planar workpiece having a relatively large area using a femtosecond laser, such as a picosecond or femtosecond pulsed laser, and the polishing operation of reducing the surface roughness of the workpiece, thereby maximizing productivity while significantly reducing machining errors.

In addition, according to the present disclosure, it is possible to reduce the surface roughness without thermal deformation in the surface of the workpiece by irradiating the metal surface with a femtosecond laser beam, instead of reducing the surface roughness by melting the metal surface as in the laser polishing of the related art.

Furthermore, it is possible to not only reduce the surface roughness by machining microscopic irregularities on the surface but also rapidly improve the flatness of the surface by selectively machining macroscopic contour-level unevenness (i.e., macroscopic unevenness that may be expressed with contour lines) by simply controlling the power of a laser beam radiated to the metal surface.

BEST MODE

Hereinafter, exemplary embodiments of the present disclosure will be described in more detail with reference to the accompanying drawings.

The term "planing" used in the present disclosure refers to a process of planarizing macroscopic contour height (i.e., macroscopic height that may be expressed with contour lines). It should be understood that the planing is a terminology coined by the applicant to be distinct from polishing and is used as a different meaning from the polishing for reducing Ra and Ry values regarding irregularities in a microscopic view.

Typically, in terms of the accuracy of precision grinding, the both processes are strictly different. That is, the accuracy of the planing of the present disclosure is about 10 μm, and the accuracy of the polishing is about 0.8 μm.

Figure 1:
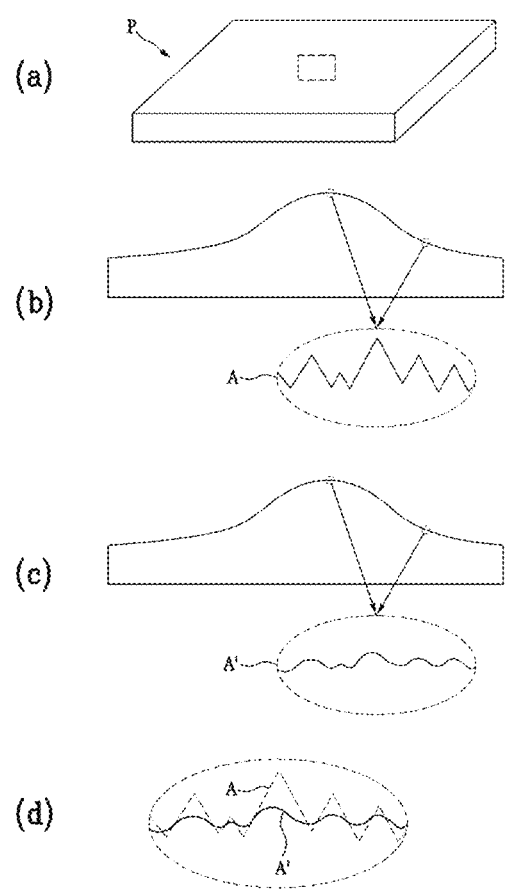
FIG. 1 is a schematic view illustrating the cross-sectional states of a workpiece before and after a laser polishing process of the related art.
Figure 2:
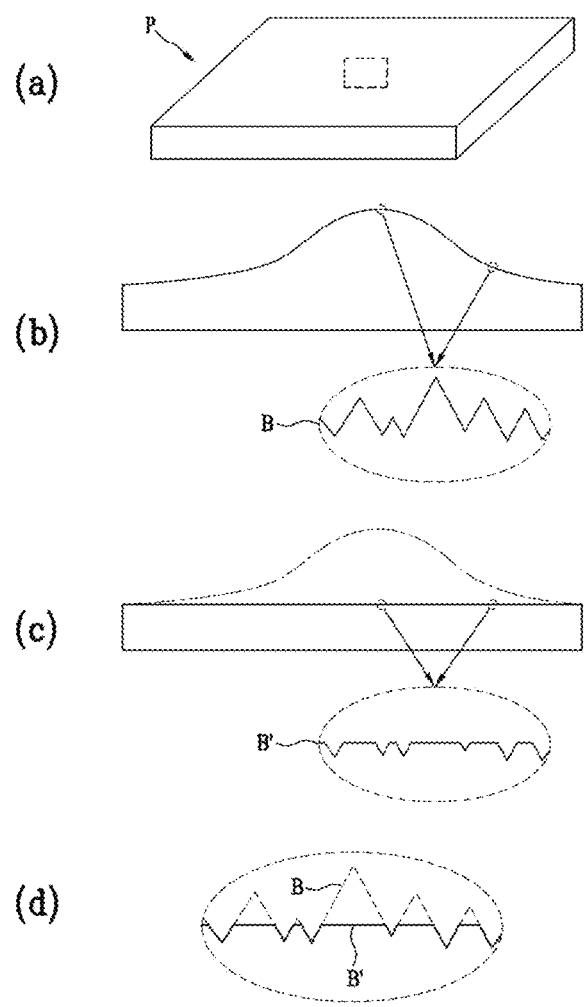
FIG. 2 is a schematic view illustrating the cross-sectional states of a workpiece before and after a process performed by a planing-polishing apparatus using a femtosecond pulsed laser according to the present disclosure, compared with FIG. 1.

FIG. 1 is a schematic view illustrating the cross-sectional states of a workpiece before and after a laser polishing process of the related art, and FIG. 2 is a schematic view illustrating the cross-sectional states of a workpiece before and after a process performed by a planing-polishing apparatus using a femtosecond pulsed laser according to the present disclosure, compared with FIG. 1.

FIG. 1(a) illustrates the shape of the workpiece having a large-area plane, with a portion of the workpiece being shown in dotted lines.

When the dotted portion is enlarged, macroscopic unevenness may be observed, with the central portion being raised, as illustrated in FIG. 1(b). This state will be referred to as a flatness-reduced state in the present application.

FIG. 1(b) illustrates the microscopic surface state of two portions A in an exaggerated manner. That is, the enlarged state of the portion A shows microscopic irregularities by which surface roughness is determined.

Irregularities, such as those formed in the portions A, extend over the entire surface of the workpiece regardless of the contour height, and are inevitably formed by mechanical grinding.

FIG. 1(c) illustrates the microscopic surface state of portions A' in which the irregularities in the portions A are significantly reduced after the laser polishing process of the related art.

As the top portions of the irregularities in the portions A are melted by a laser beam radiated thereto during the laser polishing process, the bottom portions of the irregularities may be filled. This may reduce the overall height differences between the top portions and the bottom portions, thereby reducing Ra values and Ry values by which the surface roughness is determined.

However, as illustrated in FIG. 1(c), it may be observed that, although the surface roughness is significantly reduced by the laser polishing process of the related art, there is substantially no change in the contour height in a macroscopic view and the flatness is still in the reduced state.

FIG. 1(d) only illustrates changes in the portions A before and after the laser polishing process of the related art. The portion indicated by a solid line shows the state of the irregularities reduced by the laser polishing, while the portion indicated by dotted lines shows the irregularities present before the laser polishing.

As illustrated in FIG. 1(d), it may be observed that the laser polishing process of the related art reduces the surface roughness by reducing the irregularities by a mechanism in which the top portions of the irregularities in a microscopic view are melted to fill the bottom portions of the irregularities. Consequently, the portions A are converted into the portions A' in which the top and bottom portions of the irregularities are gradually curved. As described above, thermal deformation in the surface of the workpiece due to the melting may change the hardness and the strength of the workpiece and generate residual stress in the surface.

FIGS. 2(a) to 2(d) illustrate changes in the surface of a workpiece having a large-area plane realized by the planing-polishing apparatus and method using a femtosecond pulsed laser according to the present disclosure, in comparison with FIG. 1.

Since FIGS. 2(a) and 2(b) illustrate the states before the process like FIGS. 1(a) and 1(b), repetitive descriptions will be omitted.

Referring to FIG. 2(c), it may be observed that the contour height in a macroscopic view is planarized by the planing process according to the present disclosure differently from that illustrated in FIG. 1(c), and after the planarization of the planing process, the surface roughness of irregularities in a microscopic view is reduced by the laser polishing performed on the irregularities.

It may be observed that portions B' in FIG. 2(c) are formed by removing the top portions of the irregularities, differently from the portions A' in FIG. 1(c) in which the top portions of the irregularities are melted by thermal fusion to fill the bottom portions.

That is, the laser polishing according to the present disclosure is clearly distinct from the laser polishing process of the related art, in that a mechanism of radiating a femtosecond pulsed laser beam to minimize the generation of heat and remove the top portions by physical impact is used.

As expressed in FIG. 2(d) in an exaggerated manner, this mechanism is configured to remove the top portions instead of melting the top portions with heat to fill the bottom portions.

Accordingly, the present disclosure is mainly characterized in that the surface of the workpiece has substantially no thermal deformation due to the minimized generation of heat, that there is substantially no change in the mechanical properties of the workpiece, and that substantially no residual stress is generated by heat.

Hereinafter, the planing-polishing method using a femtosecond pulsed laser according to the present disclosure, intended to realize changes in the surface of the workpiece as illustrated in FIG. 2, will be described first, followed by a description of the planing-polishing method using a femtosecond pulsed laser according to the present disclosure.

Figure 3:
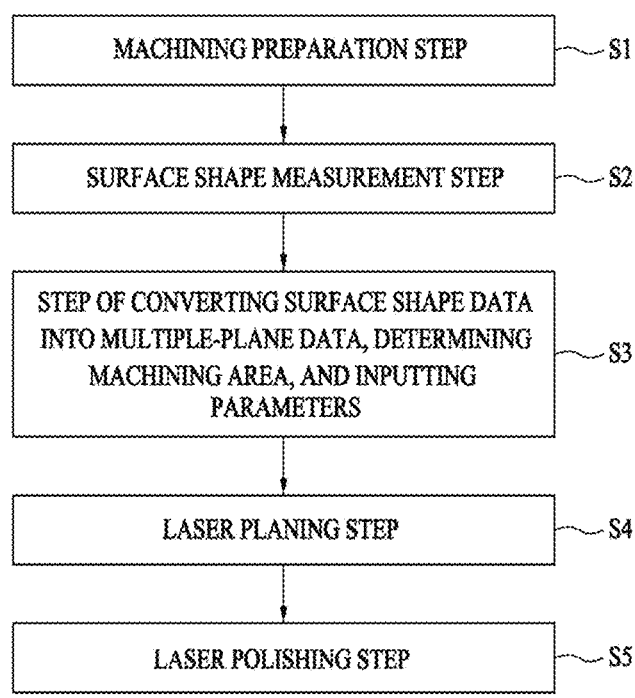
FIG. 3 is a flowchart illustrating a planing-polishing method using a femtosecond pulsed laser according to the present disclosure.
Figure 4:
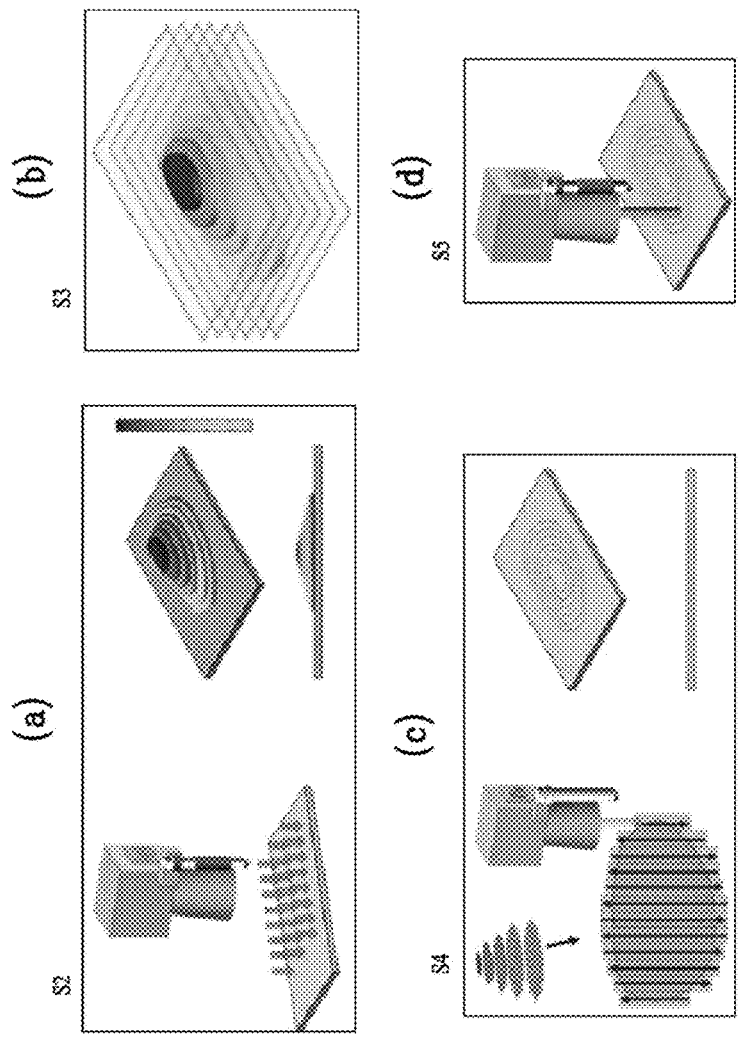
FIG. 4 is a schematic view illustrating a machining process according to the flowchart illustrated in FIG. 3.

FIG. 3 is a flowchart illustrating steps of the planing-polishing method using a femtosecond pulsed laser according to the present disclosure, and FIG. 4 is a schematic view illustrating operations according to the steps.

First, machining is prepared by locating and fixing a large-area workpiece P at the machining origin on a stage 110 in S1.

The stage 110 is a rectangular plate on which the workpiece P may be seated. Since the interior angles of the stage 110 are rectangular, the machining origin may be easily set.

The workpiece is seated at the machining origin on the stage 110, and the position of the workpiece is fixed using a fixing jig 120 (not shown), so that the position of the workpiece is not changed during the machining.

In addition, although a transport means 130 for moving the stage 110 along at least one of the X-axis, the Y-axis, and the Z-axis (height direction) may be provided, a situation in which a laser machining unit 300 moves along at least one of the X-axis, the Y-axis, and the Z-axis (height direction) will be described in the embodiment of the present disclosure, in place of a situation in which the stage 110 is moved.

The fixing jig 120 may be implemented as any means for fixing the position of the workpiece on the stage 110, without being particularly limited to a specific shape or material.

The stage 110 is a planar structure having a high level of flatness and is made from a metal material having high strength and hardness. The stage may be made from a material, such as ceramic, which is not influenced by temperature or the like, but the material for the stage is not specifically limited.

As a substantial first step of the machining, a surface shape measurement step S2 of measuring the height of the surface of the workpiece P using a laser displacement sensor and digitalizing the measured height values is performed in order to measure the flatness of the workpiece P, i.e. the degree of flatness of the surface of the workpiece P.

As illustrated in FIG. 4(a), the surface shape measurement step S2 is a step of obtaining data regarding the surface shape of the workpiece P by measuring the height at a plurality of measurement points randomly selected from the entire surface of the workpiece P and digitalizing the measurement values.

In FIG. 4(a), a total of 24 points are designated by designating 8 points on the horizontal axis and 3 points on the vertical axis, and the heights of the 24 points on the Z-axis are measured.

The height on the Z-axis is measured using a laser displacement sensor by irradiating the surface of a workpiece with a laser beam and measuring the reflecting laser beam. As a result, surface shape data as in the right section of FIG. 4(a) is obtained.

Such surface shape data ZD has a concept similar to coordinates on the Z-axis (i.e. vertical axis) and indicate simple height values on the Z-axis, such as 0, 1, 3, 5, or 9.

These data values are simple values digitalized by calculation, such as rounding, rounding off, or rounding up, within a preset range according to conditions, such as a machining amount and precision.

The central portion of the workpiece is illustrated in a rather exaggerated manner as having a convex surface shape for better understanding of the present disclosure. However, the actual height difference has a minute value of about 10 μm considering the precision of the mechanical grinding.

In the present disclosure, this surface shape is expressed by the contour height in a macroscopic view, which is a concept completely different from the irregularities in a microscopic view by which the surface roughness is determined.

One of major features of the present disclosure is that a process of planarizing the contour height in a macroscopic view and a process of reducing the irregularities in a microscopic view by which the surface roughness is determined are sequentially performed by a single apparatus.

Next, on the basis of the surface shape data ZD described above, a step S3 of determining a planing area for planarizing the contour height in a macroscopic view on the surface of a large-area planar workpiece and a laser planing step S4 will be described.

As illustrated in FIG. 4(b), virtual cross-sectional planes including two or more points having the same height on the Z-axis, on the basis of the surface shape data ZD obtained through the surface shape measurement step S2, are arranged at the same distances.

In the present disclosure, the cross-sectional planes are referred to as plane data.

The distances between the virtual cross-sectional planes may be set according to the required level of precision of the workpiece, and the thickness of the virtual cross-sectional planes may be set to any value.

After the conversion into multiple-plane data, i.e., data of a plurality of cross-sectional planes stacked on each other, a portion protruding to the same height from each of the cross-sectional planes is the planing area in which the contour height in a macroscopic view is to be planarized.

Parameters for the laser machining are determined in consideration of a plurality of conditions, such as the size or thickness, of the planing area.

Examples of these machining parameters may include the wavelength of a laser beam, a repetition rate, average power, a laser overlapping ratio, a beam focus distance, the diameter of a laser beam, the quality of a focus, a scanning rate, a moving speed of the workpiece, and the like.

The planing area is a protruding area in the multiple-plane data and is automatically determined by an input program of a controller. Such information is transmitted to the laser machining unit that directly performs the planing process.

The controller 400 determines the planing area on the basis of the plane data generated as described above, calculates the planing area as coordinates on the X-axis and the Y-axis so that the laser machining unit 300 may be moved to the determined planing area, and controls the operation of moving the laser machining unit 300 to the corresponding position.

Here, while the planing areas on respective planes of the plane data may be different, the coordinates on the X-axis and the Y-axis to be the machining area of each plane of the plane data may be calculated and varied by the controller 400.

In the present embodiment, it has been described that, when the machining parameters are determined and input, the controller transmits the corresponding information and the machining area to the laser machining unit. Alternatively, when factors regarding initial machining conditions are input, the controller may autonomously determine and adjust optimum machining parameters using a program of the controller.

As illustrated in FIG. 4(c), the laser machining unit performs a laser planing step S4 of planarizing the contour height of the surface of the workpiece by irradiating the workpiece with a laser beam in a predetermined pattern by applying predetermined machining parameters to the planing area determined in the step S3.

The left section in FIG. 4(c) illustrates a machining operation of irradiating the corresponding area with a laser beam in a line pattern, on the basis of data regarding one plane from among the plurality of planes of the multiple-plane data, by driving the laser machining unit 300.

The irradiation pattern of the laser beam may be changed variously. The planing process is sequentially performed from plane data regarding the uppermost layer to plane data regarding the lowermost layer.

Here, the planing process may be configured to be performed by moving along the Z-axis by the thicknesses of the planes of the plane data. The laser machining unit 300 may be moved downward or the stage 110 may be moved upward so as to move by the distances between the planes of the plane data.

The present embodiment relates to a situation in which the focal length of the laser is maintained to be constant, in which the laser machining unit is lowered by the distance between the planes of the multi-plane data.

The right section of FIG. 4(c) schematically illustrates a situation in which the laser planing step S4 is completed. Due to the surface shape being removed, the contour height in a macroscopic view being planarized.

The laser beam radiated in the laser planing step S4 is mainly implemented as a femtosecond pulsed laser beam, since the present disclosure provides a process mechanism of physical removal using a femtosecond pulsed laser beam, instead of a mechanism of melting a workpiece.

The laser beam used in the present embodiment is a femtosecond pulsed laser beam having a wavelength of 515 nm equal to or shorter than 580 nm, except for the infrared (IR) range, and a pulse length of 700 fs from among pulse lengths from 270 fs to 700 fs in order to minimize the thermal deformation of the surface of the workpiece.

In addition, in the used machining parameters, the repetition rate is from 250 kHz to 450 kHz, the beam size has a diameter of from 2.5 mm to 3.5 mm, and the energy per pulse is from 200 µJ to 500 µJ.

Here, while the laser planing process is being performed, the state of machining may be visually observed in real time using an optical camera CA disposed at a side of the laser machining unit. Machining conditions, such as the degree of machining or the machining parameters, may be adjusted as required.

As illustrated in FIG. 4(d), after the laser planing step S4, a laser polishing step S5 for reducing the irregularities in a microscopic view is performed in order to reduce the surface roughness of the workpiece.

The laser polishing step S5 according to the present disclosure is also realized by radiating a laser beam using the laser machining unit. The laser beam used in the laser polishing step S5 is not the same as the laser beam used in the laser planing step S4.

That is, the laser beam used in the laser polishing has an output and a repetition rate different from those of the laser beam used in the planing process so as to perform a more precise operation with much less machining.

The polishing process typically refers to a process of realizing surface roughness having an Ra value of 0.8 µm or less.

This laser polishing step S5 is a precision finishing process performed as a post process after the surface planarization is already performed by the above-described planing process, and thus, the degree of machining thereof is extremely small.

As another important characteristic from among the characteristics of the present disclosure distinct from the laser polishing of the related art, the process is performed by selectively removing (or etching) the top portions of the irregularities while reducing the irregularities in a microscopic view.

Accordingly, due to the process of planarizing the height in a macroscopic view and selectively removing the top portions of the irregularities in a microscopic view, it is possible to significantly improve the flatness of the workpiece and reduce the surface roughness of the workpiece without changing the mechanical properties of the workpiece.

Hereinafter, the planing-polishing apparatus using a femtosecond pulsed laser according to the present disclosure will be described with respect to an exemplary embodiment.

Figure 5:
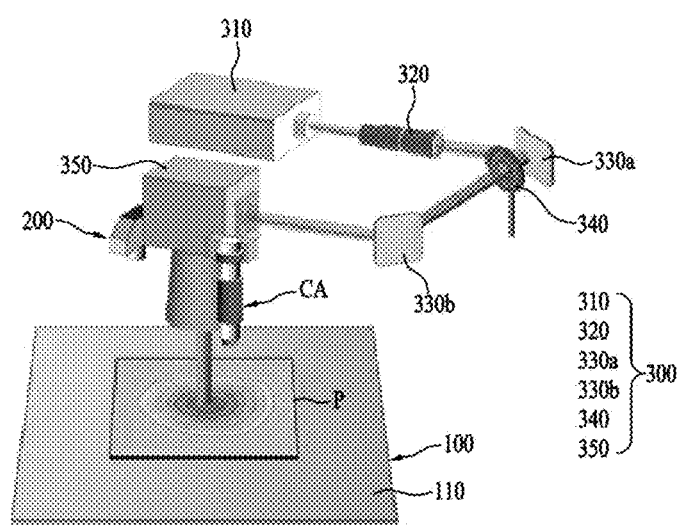
FIG. 5 is a perspective view illustrating the laser machining unit used in the planing-polishing apparatus according to the present disclosure.
Figure 6:
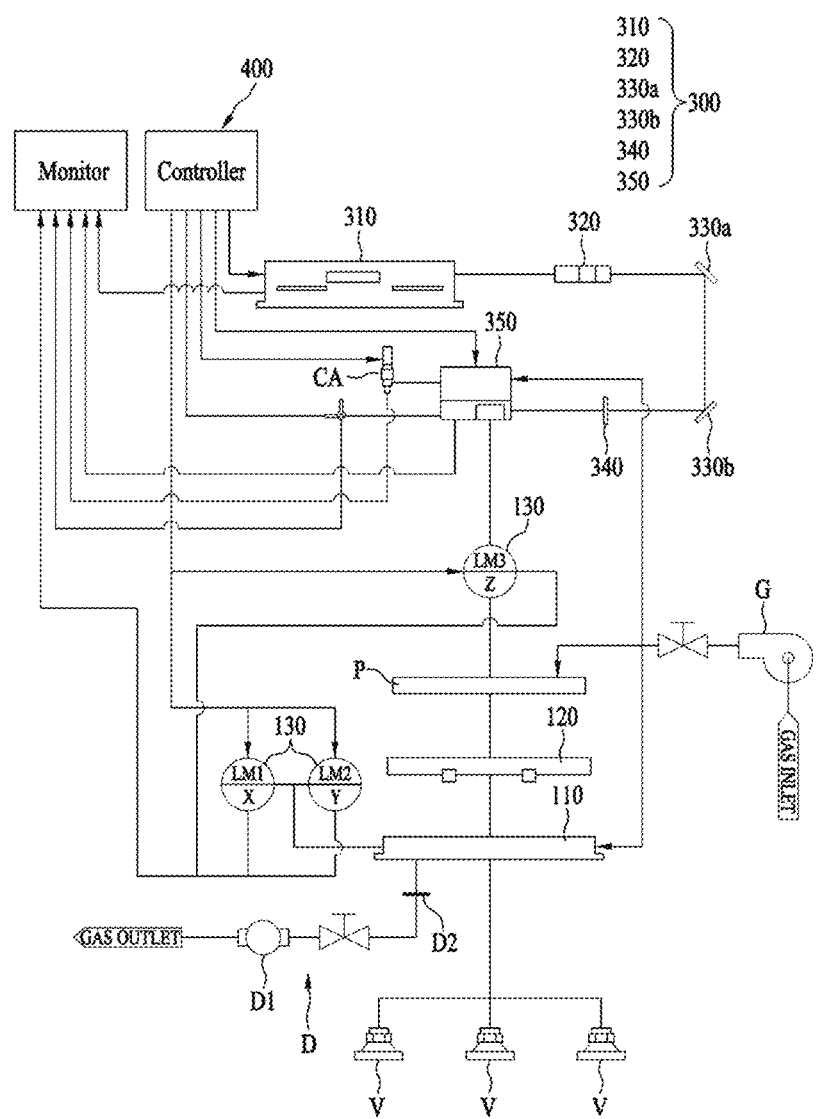
FIG. 6 is a layout view illustrating the connected state of the entire configuration of the planing-polishing apparatus according to the present disclosure.

FIG. 5 is a perspective view illustrating the laser machining unit used in the planing-polishing apparatus according to the present disclosure, and FIG. 6 is a layout view illustrating the connected state of the apparatus illustrated in FIG. 5.

As illustrated in FIG. 5, in the planing-polishing apparatus using a femtosecond pulsed laser according to the present disclosure, the workpiece P is subjected to the laser machining and the transportation while being firmly fixed by a position fixing unit 100 for fixing the position of the workpiece P.

The position fixing unit 100 includes the stage 110 on which the workpiece P is seated, the fixing jig 120 (not shown) for fixing the workpiece P on the stage 110, and the transport means 130 (not shown) for moving the stage 110 along the X-axis and the Y-axis.

The transport means 130 according to the present embodiment uses linear motors for moving the workpiece along the X-axis and the Y-axis, respectively, and a servomotor in the Z-axis (i.e. height) direction. However, detailed specification or type of the transport means 130 may be modified as required.

The transport means 130 described above may move the laser machining unit 300 and, in some cases, may move the stage 110.

The workpiece P according to the present embodiment represents a hexahedral structure having a large-area surface, such as a mold for stacked electronic ceramics, e.g., a multilayer ceramic capacitor (MLCC).

The laser machining unit 300 for radiating a laser beam is located above the workpiece P.

The laser machining unit 300 includes a generator 310 generating a laser beam, a beam expander 320, a first reflector 330a, a second reflector 330b, a beam shutter 340 disposed between the reflectors 330a and 330b, and a scanner 350 irradiating the workpiece P with the laser beam.

The generator 310 is a component generating a laser beam. In the present embodiment, the laser beam has a green light wavelength range of 515 nm capable of reducing a heat absorption rate to the workpiece P as much as possible.

The laser beam typically used to date is a laser beam in the near infrared (NIR) range having a wavelength of about 1064 nm. Due to high thermal effect, the laser beam used in the present disclosure has a wavelength of about 530 nm, i.e., about ½ of a laser wavelength corresponding to the NIR range.

Accordingly, the applicant has confirmed that the laser beam having a wavelength equal to or shorter than about 580 nm has significantly low thermal effect. It is expected that the use of a laser beam having a shorter wavelength will be more advantageous according to future development of laser technology.

The laser beam is radiated from the generator 310 to the beam expander 320. The beam expander 320 is able to adjust the size of the laser beam, i.e., expand or reduce the laser beam. The laser beam, the size of which is adjusted by the beam expander 320, is reflected in perpendicular directions by the first reflector 330a and the second reflector 330b and is radiated to the scanner 350.

A replaceable f lens is provided inside the scanner 350. A clear laser beam may be radiated by compensation for a Δf value (i.e., a focus factor) during movement along the Z-axis (i.e., in the height direction).

In addition, the beam shutter 340 having an on/off function is provided between the first reflector 330a and the second reflector 330b. The beam shutter 340 may align the laser beam by performing the function of blocking or allowing the passage of the laser beam radiated through the first reflector 330a.

The laser displacement sensor is disposed at a side of the scanner 350 to measure the flatness of the surface of the workpiece P. The laser displacement sensor is a surface shape measurement unit 200 that measures the height at a plurality of predetermined measurement points on the surface of the workpiece P, digitalizes the surface shape of the workpiece P into data, and transmits the digitalized data.

The laser displacement sensor is a component for measuring a distance from the origin to a measurement point by recognizing a change in the state between the radiated laser beam and the reflected laser bream using the straight propagation of the beam. The laser displacement sensor used in the present embodiment has a distance precision of about 0.1 μm.

The laser displacement sensor is a component for measuring the contour height in a macroscopic view of the surface of the workpiece. The laser displacement sensor digitalizes the measured contour height as relative height data on the Z-axis at a plurality of preset measurement points and transmits the digitalized height data to the controller 400.

The controller 400 receives the surface shape data ZD obtained by and transmitted from the surface shape measurement unit 200, generates multiple-plane data SD including two or more points at the same height on the data ZD, and determines a protruding area as a planing area from the multiple-plane data SD.

The number of planes of the multiple-plane data SD may be determined variously on the basis of the surface shape data ZD and according to the deviation of the surface shape data ZD, the precision of the machining, the degree of the machining, and the like.

For example, in a case in which the distance between the lowermost point and the uppermost point of the surface shape data ZD is 10 μm, 10 layers of the surface shape data ZD may be generated by equally dividing the surface shape data ZD by 1 μm or 5 layers of the surface shape data ZD may be generated by equally dividing the surface shape data ZD by 2 μm.

Thus, the controller 400 determines a plurality of planing area having the same protrusion height due to the plane data SD. The controller 400 transmits information regarding the machining area to the laser machining unit 300 and simultaneously transmits previously-input machining parameters to the laser machining unit 300. In this manner, the controller 400 controls the operation of the laser machining unit 300.

The controller 400 determines the planing area on the basis of the plane data generated as described above, calculates the planing area as coordinates on the X-axis and the Y-axis so that the laser machining unit may move to the determined planing area, and controls the operation of moving the laser machining unit 300 to the corresponding position.

Here, since the planing areas on the respective planes of the plane data may be different, the coordinates on the X-axis and the Y-axis to be the machining area of each plane of the plane data may be calculated and varied by the controller 400.

The laser beam used in the laser planing process in the present embodiment is a femtosecond pulsed laser beam having a wavelength of 515 nm. In the wavelength of the laser beam, the infrared (IR) range, i.e., a resonant frequency band having a high absorption rate to metal, is excluded. The laser beam is implemented as a femtosecond pulsed laser beam having a green light wavelength range of 515 nm and a pulse length of from 270 fs to 700 fs.

The upper limit of the laser beam for realizing the objective of the present disclosure is 580 nm, and it is expected that the laser beam having a shorter wavelength will be more advantageous.

The planing process of planarizing the surface of the workpiece P is performed by radiating the femtosecond pulsed laser beam selectively in a predetermined pattern only to the planing area determined by the plane data SD generated on the basis of the surface shape data ZD obtained by the surface shape measurement unit 200.

The laser planing process is sequentially performed from plane data regarding the uppermost plane to plane data regarding the lowermost plane at predetermined machining depths.

Since the laser planing process is sequentially performed along the Z-axis, the laser machining unit 300 may be sequentially moved downward or the stage 110 may be sequentially moved upward. In the present disclosure, the laser planing process is performed by sequentially moving the machining unit 300 downward.

When the planing process is completed by the laser machining unit 300, the contour height in a macroscopic view is in a planarized state. Subsequently, the laser polishing process of reducing the surface roughness by reducing the irregularities in a microscopic view is performed.

The laser polishing process is also enabled by a laser beam radiated by the laser machining unit 300. Since the degree of machining of the laser polishing process is significantly minute compared to that of the laser planing process, the energy and power per pulse of the radiated laser beam of the laser polishing process are significantly smaller than those of the laser planing process.

Differently from the related-art laser polishing using a mechanism of fitting the bottom portions by melting the top portions, the laser polishing according to the present disclosure uses a mechanism that reduces the irregularities by selectively removing (or etching) the top portions by physically removing particles on the metal surface using a femtosecond pulsed laser beam instead of thermally melting such particles.

In a case in which the workpiece P is, for example, a precision mold for MLCC stacking to which large load is repetitively applied, thermal deformation or a change in mechanical properties on the surface of the workpiece may be a fatal flaw. Thus, the apparatus according to the present disclosure may be considered to be innovative in the field to which the present disclosure pertains.

FIG. 6 is a layout view illustrating the connected state of the entire configuration of the planing-polishing apparatus using a femtosecond pulsed laser according to the present disclosure.

Repetitive descriptions of the above-described components will be omitted.

As illustrated in FIG. 6, two linear motors LM and a single servomotor for moving the stage 110 of the position fixing unit 100 along the X-axis, the Y-axis, and the Z-axis are provided. An anti-vibration pad V made from a rubber material for damping vibration applied from the outside is provided.

The anti-vibration pad V is not necessarily made from a rubber material. The anti-vibration pad V may be any structure, such as an air suspension, able to absorb and damp vibration.

In addition, a gas supply unit G is further provided above the workpiece P. The gas supply unit G is configured to supply an inert gas, such as helium or argon, for preventing a chemical change that would occur during the laser machining or a process gas, such as nitrogen, oxygen, or air. The gas supply unit G includes a blower for blowing a gas and a valve for controlling the supply of the gas.

Furthermore, a dust removing unit D is provided below the stage 110. The dust removing unit D is configured to remove dust that would be formed during the machining. In the present embodiment, a negative pressure generator D1 implemented as a vacuum pump able to drawing dust by generating a negative pressure around the workpiece P, a dust filter D2 for filtering the dust drawn by the vacuum pump, and a valve for controlling the negative pressure generated by the vacuum pump are also provided.

In addition, the laser machining unit 300 illustrated in FIG. 6 is rather different from FIG. 5 in that the beam shutter 340 is illustrated as being disposed between the second reflector 330b and the scanner 350. However, the beam shutter 340 is a component for blocking or allowing the passage of a laser beam. The beam shutter 340 may be modified as required according to the use and position of the reflector.

While the planing-polishing apparatus and method using a femtosecond pulsed laser according to the present disclosure have been described with respect to the exemplary embodiments, the foregoing description shall be interpreted as being illustrative of the present disclosure while not being limitative of the scope of the present disclosure.

The scope of the present disclosure is only defined by the Claims. Those skilled in the art will appreciate that a variety of modifications or alterations are possible without departing from the scope of the present disclosure and such modifications or alterations fall within the scope of the present disclosure.

The invention claimed is:

1. A planning-polishing apparatus using a femtosecond pulsed laser and performing polishing of a planar workpiece to reduce surface roughness of the workpiece after performing planning of the workpiece using a femtosecond pulsed laser beam, the apparatus comprising:
 a position fixing unit comprising a stage on which a workpiece is seated, a fixing jig for fixing the workpiece on the stage, and a transport means for moving the stage along X and Y axes, such that a surface of the workpiece is machined;
 a surface shape measurement unit digitalizing a surface shape of the workpiece into surface shape data by measuring heights at a plurality of measurement points on the surface of the workpiece and transmitting the surface shape data so that surface flatness of the workpiece is measured;
 a laser machining unit performing a planning process of planarizing for cutting only a convex portion of a machining area by selectively irradiating the machining area with a femtosecond pulsed laser beam in accordance with the surface shape data obtained from the surface shape measurement unit and, after the planning process, a polishing process of reducing irregularities formed on the surface of the workpiece by irradiating the irregularities with a femtosecond pulsed laser beam having a lower power level than the laser beam used in the laser planning step, wherein the surface shape data measured by the surface shape measurement unit is data regarding displacements along a Z-axis at the plurality of measurement points; and
 a controller converting the surface shape data into multiple-plane data, by which areas protruding to the same heights from virtual cross-sectional planes drawn by connecting points having the same heights from among the plurality of measurement points are determined to be planning areas, with the virtual cross-sectional planes being maintained to be arranged at predetermined distances in a height direction, transmitting machining parameters input for the planning process in accordance with the multiple-plane data, and controlling an operation of the laser machining unit.

2. The planning-polishing apparatus according to claim 1, wherein the surface shape measurement unit is a laser displacement sensor configured to measure heights of the measurement points by irradiating the measurement points on the surface of the workpiece with the laser beam and reading a state of the reflected laser beam.

3. The planning-polishing apparatus according to claim 1, wherein the laser beam radiated by the laser machining unit in the planning process is a femtosecond pulsed laser beam having a wavelength of 580 nm or shorter and a pulse length of from 270 fs to 700 fs.

4. The planning-polishing apparatus according to claim 3, wherein the planning process is sequentially performed from the planning area on an uppermost layer of the plane data to the planning area on a lowermost layer of the plane data by sequentially moving the laser machining unit downward or sequentially moving the stage upward along the Z-axis.

5. The planning-polishing apparatus according to claim 1, further comprising an optical camera disposed at a side of the laser machining unit, wherein the optical camera allows a state of alignment of the workpiece seated on the position fixing unit and a machining state obtained by the laser beam radiated by the laser machining unit to be visually observed in real time.

6. The planning-polishing apparatus according to claim 1, further comprising a process gas supply unit above the workpiece, the process gas supply unit being configured to control and supply a process gas that is used during laser machining performed by the laser machining unit.

7. The planning-polishing apparatus according to claim 1, further comprising a dust removing unit removing dust that is formed during laser machining performed by the laser machining unit.

8. The planning-polishing apparatus according to claim 7, wherein the dust removing unit comprises a negative pressure generator provided above the stage to generate a negative pressure around the workpiece and a filter filtering the dust drawn due to the negative pressure.

9. The planning-polishing apparatus according to claim 1, wherein the stage further comprises an elastic anti-vibration pad damping external vibration.

10. The planning-polishing apparatus according to claim 3, wherein the laser beam used in laser polishing is a femtosecond pulsed laser beam having a wavelength of 580 nm or shorter and a pulse length of from 270 fs to 700 fs.

11. A planning-polishing method using a femtosecond pulsed laser and performing laser polishing of a planar workpiece to reduce surface roughness of the workpiece after performing laser planning to planarize a surface of the planar workpiece using a femtosecond pulsed laser beam, the method comprising:
 a machining preparation step of locating and fixing the workpiece at a machining origin on a stage in order to machine a surface of the workpiece;
 a surface shape measurement step of digitalizing a surface shape of the workpiece into surface shape data by measuring heights at a plurality of measurement points on the surface of the workpiece using a laser displacement sensor;
 a step of converting the surface shape data obtained by the surface shape measurement step into multiple-plane data in which virtual cross-sectional planes drawn by connecting points having same heights from among the plurality of measurement points are arranged at predetermined distances, determining areas protruding to same heights from the cross-sectional planes as planning areas, and determining and inputting machining parameters for a planning process;
 a laser planning step of planarizing for cutting only a convex portion of the surface of the workpiece by irradiating, by a laser machining unit, the planning area determined from the surface shape data with a laser beam in a predetermined pattern to which the machining parameters are applied; and a laser polishing step of reducing irregularities formed on the surface of the workpiece by radiating a femtosecond pulsed laser beam having a lower power level than the laser beam used in the laser planning step, thereby reducing surface roughness of the workpiece.

12. The planning-polishing method according to claim 11, wherein the machining preparation step, the surface shape measurement step, the laser planning step, and the laser polishing step are performed while a state of radiation of the laser beam to the workpiece is being visually observed in real time.

13. The planning-polishing method according to claim 11, wherein the laser planning step is sequentially performed from the planning area on an uppermost layer of the plane data to the planning area on a lowermost layer of the plane data while the laser machining unit is being sequentially moved downward or the stage is being sequentially moved upward along a Z-axis.

14. The planning-polishing method according to claim 11, wherein the laser beam radiated in the laser planning step is a femtosecond pulsed laser beam having a wavelength of 580 nm or shorter and a pulse length of from 270 fs to 700 fs.

15. The planning-polishing method according to claim 11, wherein the laser planning step and the laser polishing step are performed while dust formed during laser machining is being removed by a negative pressure.

16. The planning-polishing method according to claim 11, wherein the workpiece is a precision mold used in manufacture of stacked electronic ceramics.

17. The planning-polishing method according to claim 11, wherein the laser planning step and the laser polishing step are performed while a process gas is being supplied, the process gas preventing a change in mechanical properties of the surface of the workpiece and a surface residual stress in the workpiece from occurring from laser machining.

18. The planning-polishing method according to claim 11, wherein the laser beam used in the laser polishing step is a femtosecond pulsed laser beam having a wavelength of 580 nm or shorter and a pulse length of from 270 fs to 700 fs.

* * * * *